(12) United States Patent
Cheng

(10) Patent No.: US 10,978,077 B1
(45) Date of Patent: Apr. 13, 2021

(54) KNOWLEDGE POINT MARK GENERATION SYSTEM AND METHOD THEREOF

(71) Applicant: Wisdom Garden Hong Kong Limited, Kowloon (HK)

(72) Inventor: Hsu Chen Cheng, Kowloon (HK)

(73) Assignee: Wisdom Garden Hong Kong Limited, Hong Kong (CN)

( * ) Notice: Subject to any disclaimer, the term of this patent is extended or adjusted under 35 U.S.C. 154(b) by 6 days.

(21) Appl. No.: 16/671,089

(22) Filed: Oct. 31, 2019

(51) Int. Cl.
| | |
|---|---|
| *G10L 17/00* | (2013.01) |
| *G10L 25/63* | (2013.01) |
| *G10L 17/06* | (2013.01) |
| *G06K 9/00* | (2006.01) |
| *G06K 9/46* | (2006.01) |
| *H04N 21/233* | (2011.01) |
| *H04N 21/439* | (2011.01) |
| *H04N 21/44* | (2011.01) |
| *H04N 21/234* | (2011.01) |
| *B43L 1/04* | (2006.01) |
| *H04N 21/2187* | (2011.01) |
| *G06F 40/279* | (2020.01) |

(52) U.S. Cl.
CPC .............. *G10L 17/00* (2013.01); *B43L 1/04* (2013.01); *G06F 40/279* (2020.01); *G06K 9/00335* (2013.01); *G06K 9/46* (2013.01); *G10L 17/06* (2013.01); *G10L 25/63* (2013.01); *H04N 21/2187* (2013.01); *H04N 21/233* (2013.01); *H04N 21/234* (2013.01); *H04N 21/4394* (2013.01); *H04N 21/44* (2013.01); *G06K 2209/01* (2013.01)

(58) Field of Classification Search
CPC ......... G10L 17/00; G10L 17/06; G10L 25/63; G06F 40/279; G06K 9/00335; G06K 9/46; G06K 2209/01; H04N 21/2187; H04N 21/233; H04N 21/44; H04N 21/4394; H04N 21/234; B43L 1/04
USPC ........................................................ 725/116
See application file for complete search history.

(56) References Cited

U.S. PATENT DOCUMENTS

| | | | | |
|---|---|---|---|---|
| 7,298,930 | B1 * | 11/2007 | Erol ................... | G06K 9/00711 382/305 |
| 2005/0003330 | A1 * | 1/2005 | Asgarinejad ............. | G09B 7/02 434/20 |
| 2014/0087349 | A1 * | 3/2014 | Kitch ....................... | G09B 5/06 434/308 |

(Continued)

*Primary Examiner* — Nnenna N Ekpo
(74) *Attorney, Agent, or Firm* — Chih Feng Yeh; Huntington IP Consulting Co., Ltd.

(57) ABSTRACT

A knowledge point mark generation system and a method thereof are provided. The system and the method thereof can obtain a label vocabulary by performing the analysis procedure on at least one second candidate vocabulary repeated by sound in a class, at least one first candidate vocabulary repeated by text during class, at least one second keyword highlighted by sound during class, and at least one first keyword highlighted by text during class according to their weights, and then set knowledge point marks on a timeline of a video file taken during class according to time periods when the label vocabulary appears. Thus, a learner can know the knowledge points of the class and their video clips in the video file without browsing the entire video file, so that it is convenient for the learner to learn or review the key points of the class.

12 Claims, 3 Drawing Sheets

(56) References Cited

U.S. PATENT DOCUMENTS

| | | | |
|---|---|---|---|
| 2015/0046822 A1* | 2/2015 | Kitch | G06F 3/04842 715/721 |
| 2019/0279646 A1* | 9/2019 | Tian | G10L 15/183 |
| 2019/0340944 A1* | 11/2019 | Liu | G09B 5/06 |

* cited by examiner

US 10,978,077 B1

KNOWLEDGE POINT MARK GENERATION SYSTEM AND METHOD THEREOF

BACKGROUND

1. Technical Field

The present invention relates to a mark generation system and a method thereof. In particular, the invention pertains to a knowledge point mark generation system and a method thereof.

2. Description of Related Arts

With the advancement of technology and the development of the Internet, the learners can learn or review through the video file recorded during the teaching after class.

At present, when a learner wants to learn, he can only search for the video file by the title. However, the title can provide limited information for searching, and the learner may need to browse the entire video file to know whether the video file meets his learning needs. Thus, there is a time-consuming problem.

In addition, when the learner wants to review, he usually does not know the playing time of the key point of the class (i.e., the knowledge point) that he wants to review in the video file taken during class, so he must continue to drag the progress pointer on the playback timeline or fast-forward the video to search for the video clip to be viewed, obviously causing the learner inconvenience.

In summary, it can be seen that there are problems in the prior art that the learner needs to browse the entire video file to know whether the video file meets the learning needs or search for the video clip to be viewed by dragging the progress pointer on the playback timeline or fast-forwarding the video, obviously causing the learner inconvenience. Therefore, it is necessary to propose an improved technical solution to solve this problem.

SUMMARY

In view of the prior art, there are problems in the prior art that the learner needs to browse the entire video file to know whether the video file meets the learning needs or search for the video clip to be viewed by dragging the progress pointer on the playback timeline or fast-forwarding the video, obviously causing the learner inconvenience. The present invention discloses a knowledge point mark generation system and a method thereof.

The knowledge point mark generation system disclosed in the present invention includes a capturing device, a speech recognition device, a processing device, and an integration device. The capturing device is configured to continuously capture and analyze a computer screen image, a projection image and/or a blackboard-writing image during class to continuously obtain a text, and extract at least one first keyword in the text based on font and/or font color and selected writings of the computer screen image, the projected image and/or the blackboard-writing image. The speech recognition device is configured to during class, continuously receive a sound signal, and continuously convert the sound signal into a text string through speech-to-text conversion, and determine identity of a person who makes the sound signal by voiceprint recognition or sound source identification, and then extract at least one second keyword in the text string based on the identity and/or plurality of preset words. The processing device is configured to after class, statistically analyze the text continuously obtained by the capturing device to obtain at least one first candidate vocabulary, statistically analyze the text string continuously obtained by the speech recognition device to obtain at least one second candidate vocabulary, and perform an analysis procedure based on the at least one first keyword, the at least one second keyword, the at least one first candidate vocabulary, the at least one second candidate vocabulary, and their corresponding weights to obtain a label vocabulary. The integration device is configured to after class, obtain time segments for appearance of each sentence having the label vocabulary in the text string continuously obtained by the speech recognition device, and combine the adjacent time segments into a time interval when a time difference between the adjacent time segments is less than a certain length of time, and then set a plurality of knowledge point marks corresponding to the time segments that are not combined and the time interval on a timeline of a video file taken during class.

In addition, the knowledge point mark generation, the method includes the steps of: providing a knowledge point mark generation system, comprising a capturing device, a speech recognition device, a processing device, and an integration device; continuously capturing and analyzing, by the capturing device, a computer screen image, a projection image and/or a blackboard-writing image during class to continuously obtain a text; extracting, by the capturing device, at least one first keyword in the text based on font and/or font color and selected writings of the computer screen image, the projected image and/or the blackboard-writing image; during class, continuously receiving, by the speech recognition device, a sound signal, and continuously converting the sound signal into a text string through speech-to-text conversion; determining, by the speech recognition device, identity of a person who makes the sound signal by voiceprint recognition or sound source identification; extracting, by the speech recognition device, at least one second keyword in the text string based on the identity and/or a plurality of preset words; after class, statistically analyzing, by the processing device, the text continuously obtained by the capturing device to obtain at least one first candidate vocabulary; after class, statistically analyzing, by the processing device, the text string continuously obtained by the speech recognition device to obtain at least one second candidate vocabulary; performing an analysis procedure, by the processing device, based on the at least one first keyword, the at least one second keyword, the at least one first candidate vocabulary, the at least one second candidate vocabulary, and their corresponding weights to obtain a label vocabulary; and after class, obtaining, by the integration device, time segments for appearance of each sentence having the label vocabulary in the text string continuously obtained by the speech recognition device, and combining the adjacent time segments into a time interval when a time difference between the adjacent time segments is less than a certain length of time, and then setting a plurality of knowledge point marks corresponding to the time segments that are not combined and the time interval on a timeline of a video file taken during class.

The system and method disclosed by the present invention are as above, and the differences from the prior art are that a label vocabulary is obtained by performing the analysis procedure on at least one second candidate vocabulary repeated by sound in a class, at least one first candidate vocabulary repeated by text during class, at least one second keyword highlighted by sound during class, and at least one first keyword highlighted by text during class according to their weights, and then the knowledge point marks are set on a timeline of a video file taken during class according to time periods when the label vocabulary appears to form a video file with the knowledge point marks.

By the aforementioned technology means, the present invention can enable a learner to know the knowledge points of the class and their video clips in the video file without browsing the entire video file, so that it is convenient for the learner to learn or review the key points of the class.

BRIEF DESCRIPTION OF THE DRAWINGS

The structure, operating principle and effects of the present invention will be described in detail by way of various embodiments, which are illustrated in the accompanying drawings.

DETAILED DESCRIPTION OF THE PREFERRED EMBODIMENTS

Figure 1:
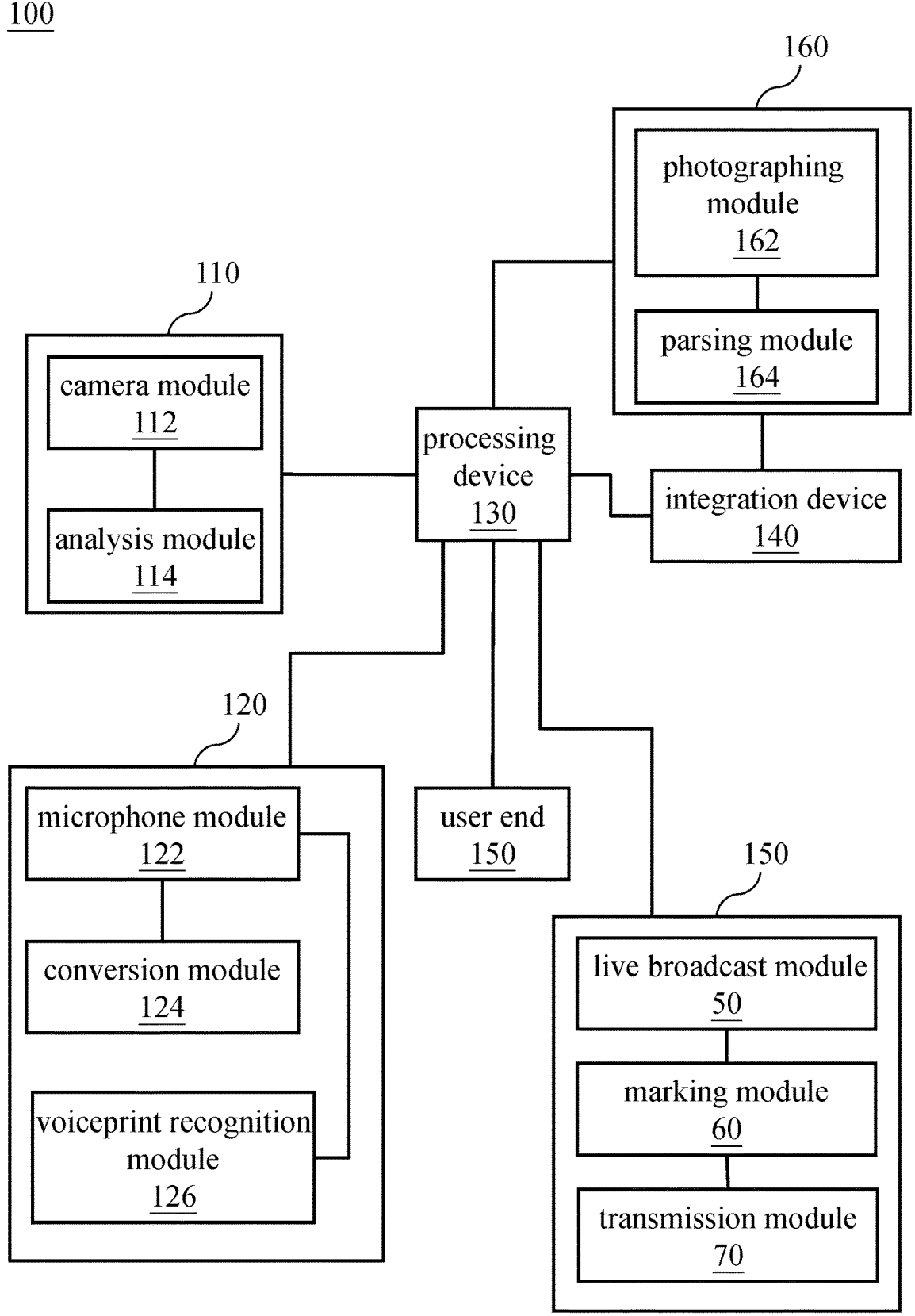
FIG. 1 is a block diagram of an embodiment of a knowledge point mark generation system of the present invention.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of components in the drawings may be exaggerated or diminished in size for the sake of clarity and convenience. Such arbitrary proportions are only illustrative and not limiting in any way. The same reference numbers are used in the drawings and description to refer to the same or like parts.

As used herein, the term "or" includes any and all combinations of one or more of the associated listed items. It will be understood that when a component is referred to as being "connected to" or "coupled to" another component, it can be directly connected or coupled to the other component, or intervening components may be present. In contrast, when a component is referred to as being "directly connected to" or "directly coupled to" another component, there are no intervening components present.

In addition, unless explicitly described to the contrary, the word "comprise" and variations such as "comprises" or "comprising", will be understood to imply the inclusion of stated components but not the exclusion of any other components.

Before describing a knowledge point mark generation system and method thereof disclosed in the present invention, the nouns of the present invention are described first. The knowledge points described in the present invention refer to the basic units of information transmission during class, and therefore, it can be known that knowledge point play an important role in the learning and navigation of the course. The invention can analyze the behaviors and events occurring during class according to the corresponding weights, so as to obtain the knowledge points of the class, and the learners can learn or review through the video file recorded during class to know the knowledge points of the class and their video clips in the video file without browsing the entire video file. In addition, the capturing device, the speech recognition device and the behavior detecting device of the present invention can be started synchronously at the beginning of each class, and can be stopped synchronously after the end of each class.

Figure 2A:
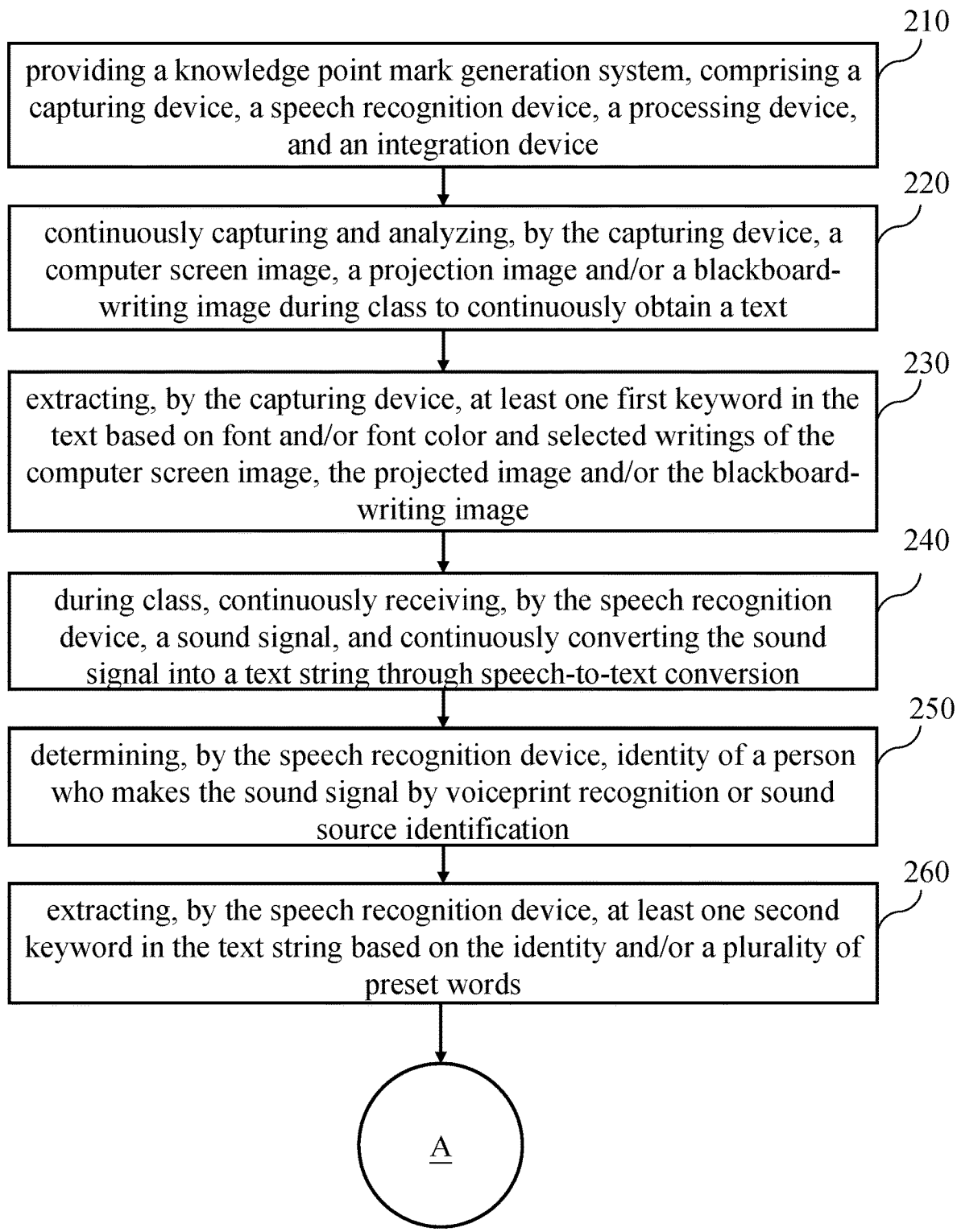
FIG. 2A and FIG. 2B are flowcharts of an embodiment of a knowledge point mark generation method executed by the knowledge point mark generation system of FIG. 1.
Figure 2B:
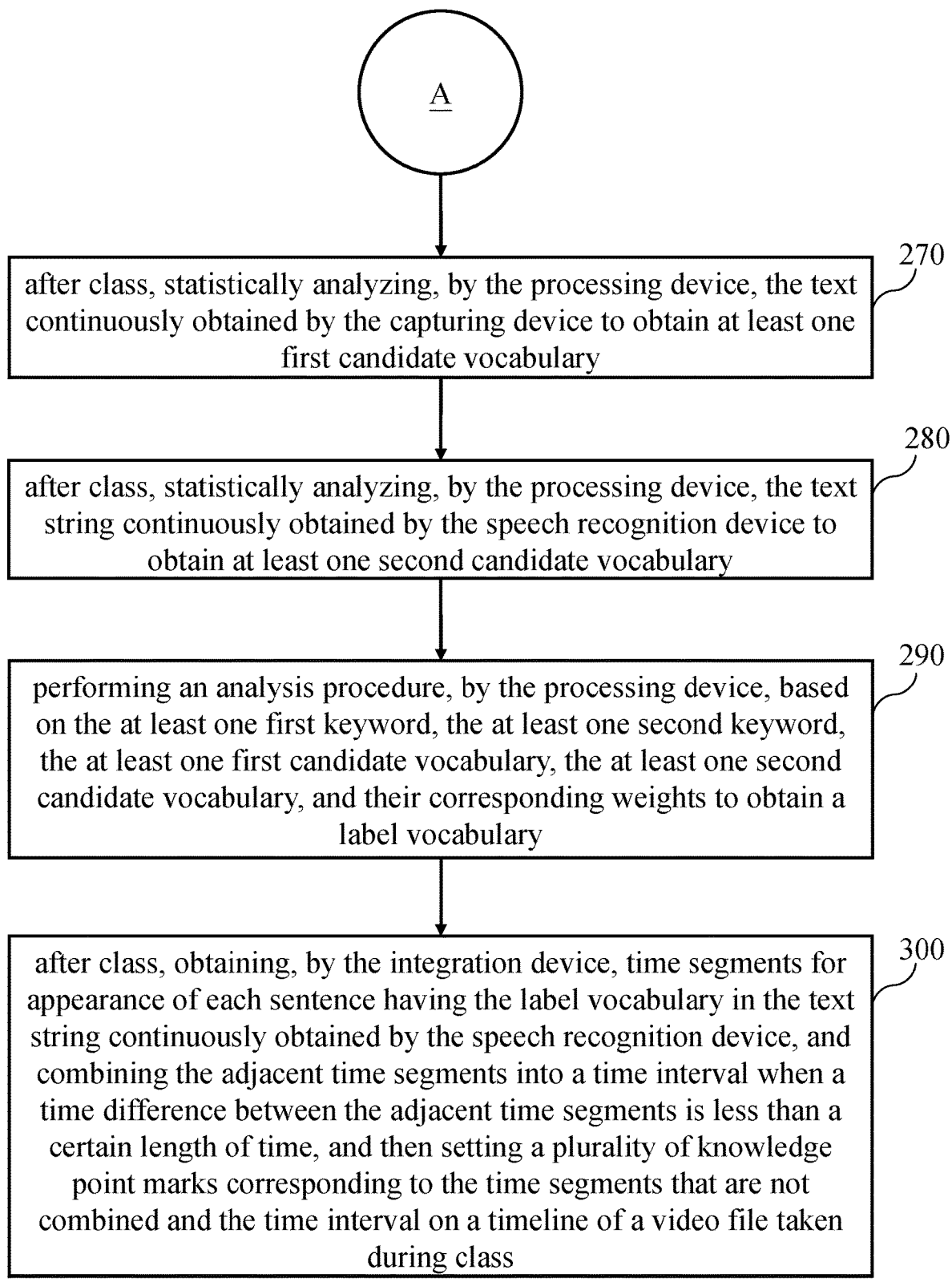

Please refer to FIG. 1, FIG. 2A and FIG. 2B, wherein FIG. 1 is a block diagram of an embodiment of a knowledge point mark generation system of the present invention, and FIG. 2A and FIG. 2B are flowcharts of an embodiment of a knowledge point mark generation method executed by the knowledge point mark generation system of FIG. 1. In this embodiment, the knowledge point mark generation system 100 includes a capturing device 110, a speech recognition device 120, a processing device 130, and an integration device 140 (step 210). The capturing device 110 is connected to the processing device 130, the speech recognition device 120 is connected to the processing device 130, and the processing device 130 is connected to the integration device 140.

The capturing device 110, the speech recognition device 120, the processing device 130, and the integration device 140 can be implemented in various manners, including software, hardware, firmware, or any combination thereof. The techniques proposed in the embodiments may be stored on a machine readable storage medium using software or firmware, such as read only memory (ROM), random access memory (RAM), disk storage media, optical storage media, Flash memory devices and the like, and may be executed by one or more general purpose or special purpose programmable microprocessors. The capturing device 110 and the processing device 130, the speech recognition device 120 and the processing device 130, and the processing device 130 and the integration device 140 can be connected to each other by wireless or wired means to for signal and information transfer.

The capturing device 110 continuously captures and analyzes a computer screen image, a projection image and/or a blackboard-writing image during class to continuously obtain a text (step 220). In more detail, the capturing device 110 can comprise a camera module 112 and an analysis module 114, and the camera module 112 is connected to the analysis module 114. The camera module 112 can be used to continuously capture images on the platform in each class. The content of the images on the platform can comprise a projection screen and/or a classroom blackboard or a whiteboard, so the camera module 112 can capture the projection image and/or the blackboard-writing image. However, this embodiment is not intended to limit the present invention, and can be adjusted according to actual needs. For example, during the computer course, the camera module 112 can be used to continuously capture a computer screen operated by the teacher to capture the computer screen image. It should be noted that the content continuously captured by the camera module 112 needs to comprise auxiliary teaching materials with text provided by the teacher, such as handouts, slides, and writings or on the blackboard or whiteboard. The analysis module 114 can continuously receive and analyze the computer screen image, the projection image and/or the blackboard-writing image captured by the camera module 112 to obtain writings in each computer screen image, each projection image, and/or each blackboard-writing image to generate the text corresponding thereto. The analysis module 114 extracts writings in each computer screen image, each projection image, and/or each blackboard-writing image through an optical character recognition (OCR) technology to form the text (that is, the image is converted to the text).

The capturing device 110 extracts at least one first keyword in the text based on font and/or font color and selected writings of the computer screen image, the projected image and/or the blackboard-writing image (step 230). In more detail, the words in the auxiliary teaching materials provided by the teacher during the class may have different fonts and/or font colors to enhance the transmission of certain knowledge points (i.e., key points), so that the learner can understand the knowledge points (i.e., key points) that the teacher wants to convey by means of words with special fonts and/or font colors. Therefore, the capturing device 110 can extracts at least one first keyword (i.e., a possible knowledge point) in the text based on font and/or font color of the computer screen image, the projected image and/or the blackboard-writing image, wherein the font can comprise, but is not limited to, font size, font weight, type of font, whether the font is italic, whether the font has a bottom line, and whether the font has a text effect. Each first keyword is a vocabulary composed of adjacent words with a special font and/or font color. In addition, in this embodiment, the writings in the computer screen image, the projected image and/or the blackboard-writing image selected by the teacher (including pointing, or selecting by hand, laser pointer or computer cursor) during class are the knowledge points (i.e., the key point) that teacher wants to wants to strengthen. Therefore, the capturing device 110 can also extracts at least one first keyword (i.e., possible knowledge points) in the text based on the selected writings of the computer screen image, the projected image and/or the blackboard-writing image, wherein each first keyword is a vocabulary composed of the selected writings. It should be noted that each first keyword extracted by different methods, such as the special font, the special font color, and the selected text, may have the same or different weights in the analysis procedure performed by the processing device 130 and the weights may be adjusted according to actual needs.

The speech recognition device 120 continuously receives the sound signal during class and continuously converts the sound signal into a text string through speech-to-text conversion (step 240). In more detail, the speech recognition device 120 can comprise a microphone module 122 and a conversion module 124. The microphone module 122 can be used to continuously receive sounds (i.e., sound signals) made by the teacher and the learner during class. The conversion module 124 can converts the sound signal continuously received by the microphone module 122 to a text string by speech-to-text conversion. The microphone module 122 can comprise a plurality of microphone units (not drawn) for being disposed in various places in the classroom to completely receive the sounds (i.e., sound signals) made by the teacher and the learner during class in the entire classroom. The number and the location of the microphone unit can be adjusted according to actual needs.

The speech recognition device 120 determines the identity of a person who makes the sound signal by voiceprint recognition or sound source identification (step 250). In more detail, the speech recognition device 120 may further comprise a voiceprint recognition module 126 for recognizing that the sound signal received by the microphone module 122 is made by the teacher or the learner, and then determining that the text string correspondingly converted by the conversion module 124 is the words spoken by the teacher or learner. In addition, in this embodiment, the position of the teacher is usually near the platform (that is, the position in front of the classroom), and the position of the learner is usually in the middle or rear of the classroom. Therefore, the position of the sound source can be determined through the microphone module 122 to determine the identity of a person who makes the sound signal. In more detail, since the microphone module 122 can comprise the plurality of microphone units disposed in various places in the classroom, the microphone module 122 can determine the position of the sound signal according to the time difference between the microphone units receiving the same sound signal and the relative arrangement positions of the microphone units, and determine the sound signal made by the teacher or the learner based on the position of the sound signal, and then determine that the text string correspondingly converted by the conversion module 124 is the words spoken by the teacher or learner.

The speech recognition device 120 extracts at least one second keyword in the text string based on the identity and/or a plurality of preset words (step 260). In more detail, the text string obtained by the teacher's sound signal and/or the text string corresponding to the preset vocabulary (e.g., special, important, key, memorize, and examination point) may have a high probability of containing knowledge points in the class. Therefore, the speech recognition device 120 may extract at least one second keyword (i.e., a possible knowledge point) from the text string obtained by the teacher's sound signal and/or corresponding to the preset vocabulary (e.g., special, important, key, memorize, and examination point). The second keyword can be extracted by semantic analysis, but the embodiment is not intended to limit the present invention. In addition, in another embodiment, the text string corresponding to the louder sound signal made by the teacher during class may also be used as one of the parameters for extracting the second keyword.

It should be noted that each second keyword extracted from the text string obtained by the teacher's sound signal and/or corresponding to the preset vocabulary (e.g., special, important, key, memorize, and examination point) may have the same or different weights in the analysis procedure performed by the processing device 130, and the weights may be adjusted according to actual needs.

After class, the processing device 130 statistically analyzes the text continuously obtained by the capturing device 110 to obtain at least one first candidate vocabulary (step 270). In more detail, the processing device 130 first counts the number of occurrences of the vocabularies in the texts obtained by the capturing device 110, and then defines the first few vocabularies with the higher frequency of occurrence as the first candidate vocabularies (i.e., possible knowledge points). It should be noted that since the frequency of occurrence of any vocabulary is too high, the vocabulary may be the main theme of the class, and it is not suitable to be the label vocabulary mentioned in the following steps. Therefore, when the processing device 130 statistically analyzes the text continuously obtained by the capturing device 110 after class, if it is determined that the frequency of any vocabulary exceeds a preset value, the vocabulary is excluded from becoming the first candidate vocabulary, wherein the preset value can be adjusted according to actual needs.

After class, the processing device 130 statistically analyzes the text string continuously obtained by the speech recognition device 120 to obtain at least one second candidate vocabulary (step 280). In more detail, the processing device 130 first counts the number of occurrences of the vocabularies in the text strings obtained by the speech recognition device 120, and defines the first few vocabularies with the higher frequency of occurrence as the second candidate vocabularies (i.e., possible knowledge points). It should be noted that since the frequency of occurrence of any vocabulary is too high, the vocabulary may be the main theme of the class, and it is not suitable to be the label vocabulary described in the following steps. Therefore, when the processing device 130 statistically analyzes the text string continuously obtained by the speech recognition device 120 after class, if it is determined that the frequency of any vocabulary exceeds the preset value, the vocabulary is excluded from becoming the second candidate vocabulary, wherein the preset value can be adjusted according to actual needs.

The processing device 130 performs an analysis procedure based on the at least one first keyword, the at least one second keyword, the at least one first candidate vocabulary, the at least one second candidate vocabulary, and their corresponding weights to obtain a label vocabulary (step 290). In more detail, since the probabilities of the at least one first keyword, the at least one second keyword, the at least one first candidate vocabulary, and the at least one second candidate vocabulary becoming knowledge points are different, in the analysis procedure for determining the knowledge points of the class, the weights corresponding to the at least one first keyword, the at least one second keyword, the at least one first candidate vocabulary, and the at least one second candidate vocabulary are different, and the weights can be adjusted according to actual needs. The analysis procedure is performed to determine the knowledge points (i.e., label vocabularies) of the class by using the at least one first keyword, the at least one second keyword, the at least one first candidate vocabulary, the at least one second candidate vocabulary and their weights, and the number of knowledge point (i.e. label vocabulary) can be adjusted according to actual needs.

When the number of knowledge point (i.e. label vocabulary) is one, after class, the integration device 140 obtains time segments for appearance of each sentence having the label vocabulary in the text string continuously obtained by the speech recognition device 120, and combining the adjacent time segments into a time interval when a time difference between the adjacent time segments is less than a certain length of time, and then setting a plurality of knowledge point marks corresponding to the time segments that are not combined and the time interval on a timeline of a video file taken during class (step 300). In more detail, the knowledge point mark generation system 100 may further comprise a camera device (not drawn) for shooting video files placed on the platform or website for the learner to learn or review, and for shooting streaming video to broadcast the class (that is, live broadcasting and storing the streaming video of the class at the same time to generate the video file of the class after class), wherein the camera device, the capturing device 110 and the speech recognition device 120 can be started synchronously at the beginning of each class, and can be stopped synchronously after the end of each class. Through the above step 290, a knowledge point (i.e., a label vocabulary) of the class can be obtained. Therefore, the integration device 140 can search for time segments for appearance of each sentence having the label vocabulary in the text string continuously obtained by the speech recognition device 120, and combine the adjacent time segments into a time interval when a time difference between the adjacent time segments is less than a certain length of time, wherein the length of a certain length of time can be adjusted according to actual needs. Then, after class, the integration device 140 may set a plurality of knowledge point marks according to the time segments that are not combined and the time interval on a timeline of the video file taken during class to form the video file with the plurality of knowledge point marks.

When the number of the label vocabulary is plural, the integration device 140 can find the unmerged time segments and time intervals corresponding to each label vocabulary according to the above process, and then distinguish the knowledge point marks corresponding to different label vocabularies according to different colors, so that the learner can distinguish the knowledge point marks corresponding to different label vocabularies. For example, when the label vocabularies are "Fourier transform" and "Laplace transform", the knowledge point marks corresponding to the "Fourier transform" set on the timeline of the video file can be, but are not limited to, yellow, the knowledge point marks corresponding to "Fourier transform" may be, but not limited to, green, but the present example is not intended to limit the present invention.

In this embodiment, the label vocabulary of the class is determined through the at least one first keyword, the at least one second keyword, the at least one first candidate vocabulary, the at least one second candidate vocabulary and their weights. Besides, each learner's behavior during class, such as looking up at the blackboard and bowing his head to write down notes, can be considered as one of the parameters that determine the label vocabulary of the class, as detailed below. In this embodiment, the knowledge point mark generation system 100 may further comprise a behavior detecting device 160. The knowledge point mark generation method may further comprise the steps of: continuously receiving and analyzing, by the behavior detecting device 160, the learner's classroom image during class to obtain a behavior recognition signal of each learner; generating, by the processing device 130, a behavior string according to the text string obtained by the speech recognition device 120 within an expected time interval before and after the time at which the behavior recognition signals of any of the learners obtained by the behavior detecting device 160 are considered that the learner looks up at the blackboard or bows his head to write a note; analyzing, by the processing device 130, the behavior string by a statistical method, a head-up rate of the whole class of learners, and/or a ratio of writing notes of the whole class of learners to obtain at least a fourth candidate vocabulary; and further considering, by the processing device 130, the at least one fourth candidate vocabulary and its corresponding weight when performing the analysis procedure to obtain the label vocabulary.

In more detail, the behavior detecting device 160 may comprise a photographing module 162 and a parsing module 164, and the photographing module 162 is connected to the parsing module 164. The photographing module 162 can be used to continuously capture images of each learner's location in the classroom in each class (i.e., the image of each learner in the classroom is the learner's classroom image). By analyzing the images continuously captured by the photographing module 162, a behavior recognition signal of each learner (i.e., the dynamic behavior of each learner) can be obtained. When the learner looks up at the projection image, the blackboard and/or the whiteboard or bows his head to write down notes, it means that the content taught by the teacher at the time may be the key point (i.e., the knowledge point). Thus, when the behavior recognition signal of any learner obtained by the behavior detecting device 160 is determined that the learner looks up at the projection image, the blackboard and/or the whiteboard or bows his head to write down notes, the processing device 130 can generate a behavior string according to the text strings obtained by the speech recognition device 120 within an expected time interval before and after the occurrence time at which the learner looks up at the projection image, the blackboard and/or the whiteboard or bows his head to write down notes, wherein the value of the expected time interval can be adjusted according to actual needs. The processing device 130 may first count the words in the behavior strings generated by the processing device 130, and then define the first few words with higher frequency of occurrence as the fourth candidate vocabularies (i.e., possible knowledge points).

In addition, when the number of learner looking up at the projection image, the blackboard and/or the whiteboard, or bowing his head to write down notes at the same time increases, it means that the text string obtained by the speech recognition device 120 before and after the time point when the learners look up at the projection image, the blackboard and/or the whiteboard, or bow their head to write down notes is more likely the knowledge point of the class. Therefore, in the process of obtaining the fourth candidate vocabulary, the processing device 130 needs to consider the head-up rate of the whole class of learners, and/or a ratio of writing notes of the whole class of learners as reference factors, thereby obtaining at least one fourth candidate vocabulary. Then, the processing device 130 may further consider the at least one fourth candidate vocabulary in the analysis procedure according to its weight to obtain the label vocabulary, wherein the weight corresponding to the at least one fourth candidate vocabulary may be adjusted according to actual needs.

Furthermore, in this embodiment, the label vocabulary of the class is determined through the at least one first keyword, the at least one second keyword, the at least one first candidate vocabulary, the at least one second candidate vocabulary and their weights. Besides, the behavior of each learner who learns through live broadcast, such as setting at least one tag information during the live stream of the streaming video, can be considered as one of the parameters that determine the label vocabulary of the class, as detailed below. In this embodiment, the knowledge point mark generation system 100 may further comprise at least one user end 150, wherein each learner can learn through live broadcast by the user end 150 he owns.

Each user end 150 comprises a live broadcast module 50, a marking module 60, and a transmission module 70. The knowledge point mark generation method may further comprise the steps of: continuously lives stream, by the live broadcast module 50 of each user end 150, a streaming video during class; setting, by the marking module 60 of each user end 150, at least one tag information during the live stream of the streaming video; transmitting, by the transmission module 70 of each user end 150, a time point at which each of the at least one tag information is set to the processing device 130; after class, generating, by the processing device 130, a tag string according to the text string obtained by the speech recognition device 120 within a predetermined time interval before and after the time point at which each of the at least one tag information is set by each user end 150; statistically analyzing, by the processing device 130, the tag string to obtain at least one third candidate vocabulary; and further considering, by the processing device 130, the at least one third candidate vocabulary and its corresponding weight when performing the analysis procedure to obtain the label vocabulary. The number of the user end 150 can be adjusted according to actual needs. In order to avoid the complexity of FIG. 1, only two user ends 150 are drawn, and the actual number of the user end 150 can be adjusted according to actual needs.

In other words, each learner can set the tag information for the part taught by the teacher at the current time interval (similar to the above concept of writing down notes) when the learner learns through live broadcast by the user end 150 he owns (that is, during the live stream of the streaming video). When the learner sets the tag information, it means that the content taught by the teacher at the time may be the key point (i.e., the knowledge point). Thus, when any learner sets the tag information by the user end 150 he owns, the processing device 130 generates a tag string according to the text string obtained by the speech recognition device 120 within a predetermined time interval before and after the occurrence time of the learner setting tag information, wherein the value of the predetermined time interval can be adjusted according to actual needs. The processing device 130 may first count the vocabulary in the obtained tag strings, and then define the first few vocabularies with the higher frequency of occurrence as the third candidate vocabularies (i.e., possible knowledge points). Then, the processing device 130 may further consider the at least one third candidate vocabulary in the analysis program according to its weight to obtain the label vocabulary, wherein the weight corresponding to the at least one third candidate vocabulary may be adjusted according to actual needs.

It is to be noted that the knowledge point mark generation method of the present embodiment can perform the above steps in any order, except for explaining the causal relationship.

In summary, it can be seen that the differences from the prior art are that a label vocabulary is obtained by performing the analysis procedure on at least one second candidate vocabulary repeated by sound in a class, at least one first candidate vocabulary repeated by text during class, at least one second keyword highlighted by sound during class, and at least one first keyword highlighted by text during class according to their weights, and then the knowledge point marks are set on a timeline of a video file taken during class according to time periods when the label vocabulary appears to form a video file with the knowledge point marks. By this technical means, the problems of the prior art can be solved. In addition, the present invention can enable a learner to know the knowledge points of the class and their video clips in the video file without browsing the entire video file, it is convenient for the learner to learn or review the key points of the class.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A knowledge point mark generation system, comprising:
   a capturing device, configured to continuously capture and analyze a computer screen image, a projection image and/or a blackboard-writing image during class to continuously obtain a text, and extract at least one first keyword in the text based on font and/or font color and selected writings of the computer screen image, the projected image and/or the blackboard-writing image;
   a speech recognition device, configured to during class, continuously receive a sound signal, and continuously convert the sound signal into a text string through speech-to-text conversion, and determine identity of a person who makes the sound signal by voiceprint recognition or sound source identification, and then extract at least one second keyword in the text string based on the identity and/or a plurality of preset words;

a processing device, configured to after class, statistically analyze the text continuously obtained by the capturing device to obtain at least one first candidate vocabulary, statistically analyze the text string continuously obtained by the speech recognition device to obtain at least one second candidate vocabulary, and perform an analysis procedure based on the at least one first keyword, the at least one second keyword, the at least one first candidate vocabulary, the at least one second candidate vocabulary, and their corresponding weights to obtain a label vocabulary; and an integration device, configured to after class, obtain time segments for appearance of each sentence having the label vocabulary in the text string continuously obtained by the speech recognition device, and combine the adjacent time segments into a time interval when a time difference between the adjacent time segments is less than a certain length of time, and then set a plurality of knowledge point marks corresponding to the time segments that are not combined and the time interval on a timeline of a video file taken during class.

2. The knowledge point mark generation system according to claim 1, wherein the knowledge point mark generation system further comprises:

at least one user end, each of the at least one user end includes:
   a live broadcast module, configured to continuously live stream a streaming video during class;
   a marking module, configured to set at least one tag information during the live stream of the streaming video; and
   a transmission module, configured to transmit a time point at which each of the at least one tag information is set to the processing device;

wherein the processing device generates a tag string according to the text string obtained by the speech recognition device within a predetermined time interval before and after the time point at which each of the at least one tag information is set by each of the at least one user end after class, and statistically analyzes the tag string to obtain at least one third candidate vocabulary, and further considering the at least one third candidate vocabulary and its corresponding weight when performing the analysis procedure to obtain the label vocabulary.

3. The knowledge point mark generation system according to claim 1, wherein the knowledge point mark generation system further comprises:

a behavior detecting device, configured to continuously receive and analyze a learner's classroom image during class to obtain a behavior recognition signal of each learner;

wherein the processing device generates a behavior string according to the text string obtained by the speech recognition device within an expected time interval before and after the time at which the behavior recognition signals of any of the learners obtained by the behavior detecting device are considered that the learner looks up or writes a note, and analyzes the behavior string by a statistical method, a head-up rate of the whole class of learners, and/or a ratio of writing notes of the whole class of learners to obtain at least a fourth candidate vocabulary, and then further considers the at least one fourth candidate vocabulary and its corresponding weight when performing the analysis procedure to obtain the label vocabulary.

4. The knowledge point mark generation system according to claim 1, wherein when the processing device obtains a plurality of the label vocabulary by performing the analysis procedure based on the at least one first keyword, the at least one second keyword, the at least one first candidate vocabulary, the at least one second candidate vocabulary, and their corresponding weights, the integration device distinguishes the knowledge point marks corresponding to different label vocabularies according to different colors.

5. The knowledge point mark generation system according to claim 1, wherein if it is determined that the frequency of occurrence of any vocabulary exceeds a preset value, the vocabulary is excluded from becoming the first candidate vocabulary or the second candidate vocabulary when the processing device statistically analyzes the text continuously obtained by the capturing device or the text string continuously obtained by the speech recognition device.

6. A knowledge point mark generation method, comprising the steps of:

providing a knowledge point mark generation system, comprising a capturing device, a speech recognition device, a processing device, and an integration device;

continuously capturing and analyzing, by the capturing device, a computer screen image, a projection image and/or a blackboard-writing image during class to continuously obtain a text;

extracting, by the capturing device, at least one first keyword in the text based on font and/or font color and selected writings of the computer screen image, the projected image and/or the blackboard-writing image;

during class, continuously receiving, by the speech recognition device, a sound signal, and continuously converting the sound signal into a text string through speech-to-text conversion;

determining, by the speech recognition device, identity of a person who makes the sound signal by voiceprint recognition or sound source identification;

extracting, by the speech recognition device, at least one second keyword in the text string based on the identity and/or a plurality of preset words;

after class, statistically analyzing, by the processing device, the text continuously obtained by the capturing device to obtain at least one first candidate vocabulary;

after class, statistically analyzing, by the processing device, the text string continuously obtained by the speech recognition device to obtain at least one second candidate vocabulary;

performing an analysis procedure, by the processing device, based on the at least one first keyword, the at least one second keyword, the at least one first candidate vocabulary, the at least one second candidate vocabulary, and their corresponding weights to obtain a label vocabulary; and after class, obtaining, by the integration device, time segments for appearance of each sentence having the label vocabulary in the text string continuously obtained by the speech recognition device, and combining the adjacent time segments into a time interval when a time difference between the adjacent time segments is less than a certain length of time, and then setting a plurality of knowledge point marks corresponding to the time segments that are not combined and the time interval on a timeline of a video file taken during class.

7. The knowledge point mark generation method according to claim 6, wherein the knowledge point mark generation system further includes at least one user end, each of the at least one user end includes a live broadcast module, a mark module, and a transmission module, and the knowledge point mark generation method further comprises the steps of:

continuously live streaming, by the live broadcast module of each of the at least one user end, a streaming video during class;

setting at least one tag information, by the mark module of each of the at least one user end, during the live stream of the streaming video;

transmitting, by the transmission module of each of the at least one user end, a time point at which each of the at least one tag information is set to the processing device;

after class, generating, by the processing device, a tag string according to the text string obtained by the speech recognition device within a predetermined time interval before and after the time point at which each of the at least one tag information is set by each of the at least one user end;

statistically analyzing, by the processing device, the tag string to obtain at least one third candidate vocabulary; and further considering, by the processing device, the at least one third candidate vocabulary and its corresponding weight when performing the analysis procedure to obtain the label vocabulary.

8. The knowledge point mark generation method according to claim 6, wherein the knowledge point mark generation system further includes a behavior detecting device, and the knowledge point mark generation method further comprises the steps of:

continuously receiving and analyzing, by the behavior detecting device, a learner's classroom image during classroom during class to obtain a behavior recognition signal of each learner;

generating, by the processing device, a behavior string according to the text string obtained by the speech recognition device within an expected time interval before and after the time at which the behavior recognition signals of any of the learners obtained by the behavior detecting device are considered that the learner looks up or writes a note;

analyzing, by the processing device, the behavior string by a statistical method, a head-up rate of the whole class of learners, and/or a ratio of writing notes of the whole class of learners to obtain at least a fourth candidate vocabulary; and further considering, by the processing device, the at least one fourth candidate vocabulary and its corresponding weight when performing the analysis procedure to obtain the label vocabulary.

9. The knowledge point mark generation method according to claim 6, wherein when the processing device obtains a plurality of the label vocabulary by performing the analysis procedure based on the at least one first keyword, the at least one second keyword, the at least one first candidate vocabulary, the at least one second candidate vocabulary, and their corresponding weights, the integration device distinguishes the knowledge point marks corresponding to different label vocabularies according to different colors.

10. The knowledge point mark generation method according to claim 6, wherein if it is determined that the frequency of occurrence of any vocabulary exceeds a preset value, the vocabulary is excluded from becoming the first candidate vocabulary or the second candidate vocabulary when the processing device statistically analyzes the text continuously obtained by the capturing device or the text string continuously obtained by the speech recognition device.

11. The knowledge point mark generation system according to claim 2, wherein the knowledge point mark generation system further comprises:

a behavior detecting device, configured to continuously receive and analyze a learner's classroom image during class to obtain a behavior recognition signal of each learner;

wherein the processing device generates a behavior string according to the text string obtained by the speech recognition device within an expected time interval before and after the time at which the behavior recognition signals of any of the learners obtained by the behavior detecting device are considered that the learner looks up or writes a note, and analyzes the behavior string by a statistical method, a head-up rate of the whole class of learners, and/or a ratio of writing notes of the whole class of learners to obtain at least a fourth candidate vocabulary, and then further considers the at least one fourth candidate vocabulary and its corresponding weight when performing the analysis procedure to obtain the label vocabulary.

12. The knowledge point mark generation method according to claim 7, wherein the knowledge point mark generation system further includes a behavior detecting device, and the knowledge point mark generation method further comprises the steps of:

continuously receiving and analyzing, by the behavior detecting device, a learner's classroom image during classroom during class to obtain a behavior recognition signal of each learner;

generating, by the processing device, a behavior string according to the text string obtained by the speech recognition device within an expected time interval before and after the time at which the behavior recognition signals of any of the learners obtained by the behavior detecting device are considered that the learner looks up or writes a note;

analyzing, by the processing device, the behavior string by a statistical method, a head-up rate of the whole class of learners, and/or a ratio of writing notes of the whole class of learners to obtain at least a fourth candidate vocabulary; and further considering, by the processing device, the at least one fourth candidate vocabulary and its corresponding weight when performing the analysis procedure to obtain the label vocabulary.

* * * * *